(12) United States Patent
Huang et al.

(10) Patent No.: US 12,052,719 B2
(45) Date of Patent: *Jul. 30, 2024

(54) CHANNEL STATE INFORMATION AND HYBRID AUTOMATIC REPEAT REQUEST FEEDBACK RESOURCE ALLOCATION IN 5G

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/447,621

(22) Filed: Sep. 14, 2021

(65) Prior Publication Data
US 2022/0095298 A1    Mar. 24, 2022

Related U.S. Application Data

(63) Continuation of application No. 16/192,482, filed on Nov. 15, 2018, now Pat. No. 11,122,549.

(Continued)

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1671* (2013.01); *H04L 1/1829* (2013.01);
(Continued)

(58) Field of Classification Search
CPC .... H04W 72/21; H04L 1/1671; H04L 1/1829; H04L 1/1861; H04L 1/1893;
(Continued)

(56) References Cited

U.S. PATENT DOCUMENTS 9,826,546 B2 * 11/2017 Li .......................... H04L 5/0053
10,194,450 B2    1/2019 Cheng et al.
(Continued)

FOREIGN PATENT DOCUMENTS

CN    104641572 A    5/2015
CN    106257856 A    12/2016
(Continued)

OTHER PUBLICATIONS

Taiwan Search Report—TW107140795—TIPO—Nov. 10, 2021.
(Continued)

*Primary Examiner* — Jung H Park
(74) *Attorney, Agent, or Firm* — Harrity & Harrity, LLP

(57) ABSTRACT

Various aspects of the present disclosure generally relate to wireless communication. In some aspects, a user equipment may map channel state information (CSI) to first resource elements that are distributed in frequency, wherein the first resource elements are in a set of resources allocated on an uplink shared channel; map hybrid automatic repeat request (HARQ) feedback to second resource elements that are distributed in frequency, wherein the second resource elements are in the set of resources; wherein the second resource elements are reserved for the HARQ feedback and are different from the first resource elements; and transmit the CSI and the HARQ feedback on the uplink shared channel in accordance with the mappings. Numerous other aspects are provided.

34 Claims, 10 Drawing Sheets

Related U.S. Application Data

(60) Provisional application No. 62/588,301, filed on Nov. 17, 2017.

(51) Int. Cl.
*H04L 1/1829* (2023.01)
*H04L 1/1867* (2023.01)
*H04L 5/00* (2006.01)

(52) U.S. Cl.
CPC .......... *H04L 1/1861* (2013.01); *H04L 1/1893* (2013.01); *H04L 5/0007* (2013.01); *H04L 5/0048* (2013.01); *H04L 5/0053* (2013.01); *H04L 5/0055* (2013.01); *H04L 5/0057* (2013.01)

(58) Field of Classification Search
CPC ... H04L 5/0007; H04L 5/0048; H04L 5/0053; H04L 5/0055; H04L 5/0057; H04L 1/1812
See application file for complete search history.

(56) References Cited

U.S. PATENT DOCUMENTS

| | | |
|---|---|---|
| 11,122,549 B2 | 9/2021 | Huang et al. |
| 2011/0228863 A1 | 9/2011 | Papasakellariou et al. |
| 2013/0121271 A1 | 5/2013 | Chen et al. |
| 2018/0110041 A1* | 4/2018 | Bendlin .............. H04W 72/044 |
| 2018/0167931 A1* | 6/2018 | Papasakellariou .... H04L 5/0091 |
| 2018/0227908 A1 | 8/2018 | Wang et al. |
| 2019/0007923 A1 | 1/2019 | Blankenship et al. |
| 2019/0165896 A1 | 5/2019 | Huang et al. |

FOREIGN PATENT DOCUMENTS

| | | |
|---|---|---|
| KR | 20150105353 A | 9/2015 |
| WO | 2017019132 A1 | 2/2017 |

OTHER PUBLICATIONS

International Preliminary Report on Patentability—PCT/US2018/061471, The International Bureau of WIPO—Geneva, Switzerland, May 28, 2020.

International Search Report and Written Opinion—PCT/US2018/061471—ISA/EPO—Apr. 29, 2019.

Mediatek Inc: "Discussion on UCI Multiplexing", 3GPP Draft, 3GPP TSG RAN WG1 Meeting 90bis, R1-1718342_Discussion on UCI Multiplexing, 3RD Generation Partnership Project (3GPP), Mobile Competence Centre, 650, Route Des Lucioles, F-06921 Sophia-Antipolis Cedex , France, vol. RAN WG1, No. Prague, CZ, Oct. 9, 2017-Oct. 13, 2017, Oct. 8, 2017 (Oct. 8, 2017), XP051341525, 11 pages, Retrieved from the Internet: URL:http://www.3gpp.org/ftp/Meetings_3GPP_SYNC/RAN1/Docs/ [retrieved on Oct. 8, 2017].

Qualcomm Incorporated: "Multiplexing of PUCCH and PUSCH", 3GPP Draft, R1-1718565 Multiplexing of PUCCH and PUSCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341746, 8 Pages, Retrieved from the Internet: URL:http://www.3gpp.org/ftp/Meetings_3GPP_SYNC/RAN1/Docs/ [retrieved on Oct. 8, 2017].

Taiwan Search Report—TW107140795—TIPO—Mar. 17, 2022.

* cited by examiner

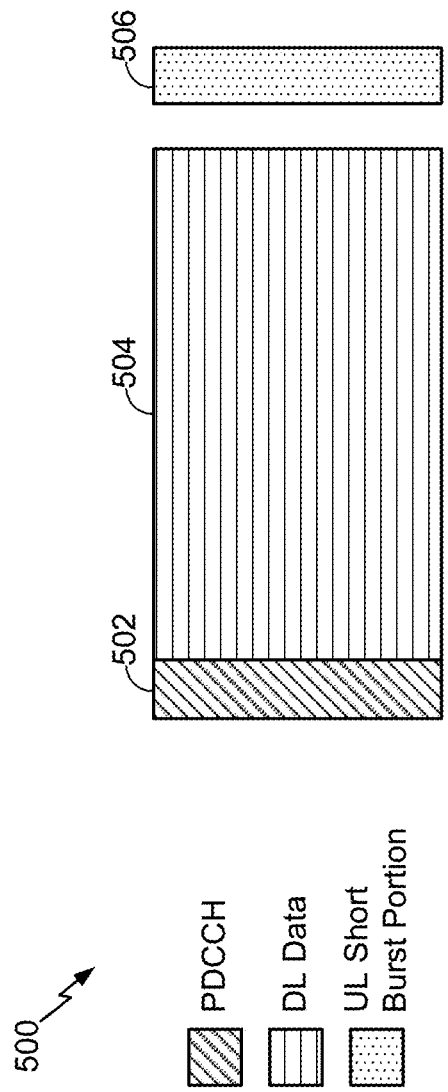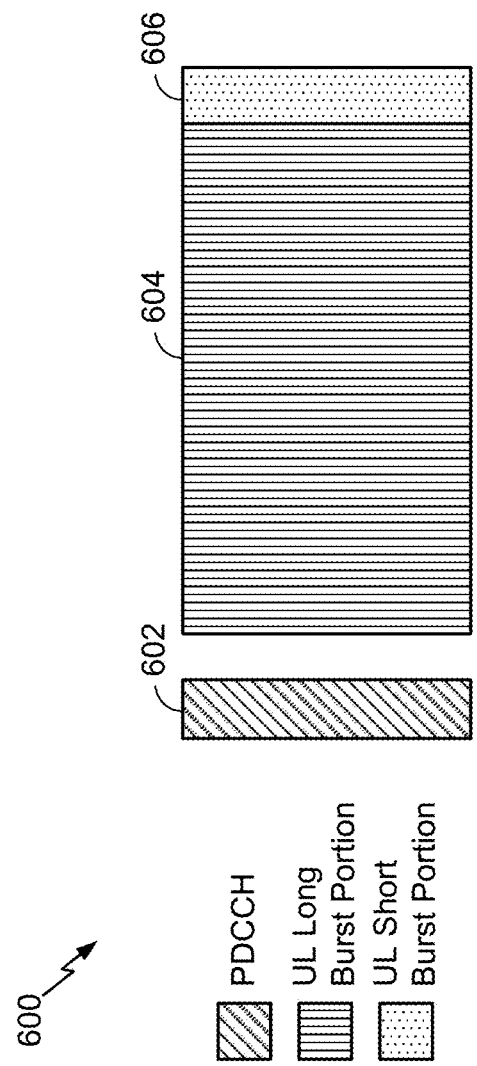

CHANNEL STATE INFORMATION AND HYBRID AUTOMATIC REPEAT REQUEST FEEDBACK RESOURCE ALLOCATION IN 5G

CROSS-REFERENCE TO RELATED APPLICATIONS UNDER 35 U.S.C. § 119

This application is a continuation of U.S. patent application Ser. No. 16/192,482, filed Nov. 15, 2018 (now U.S. Pat. No. 11,122,549), entitled "CHANNEL STATE INFORMATION AND HYBRID AUTOMATIC REPEAT REQUEST FEEDBACK RESOURCE ALLOCATION IN 5G," which claims priority to U.S. Provisional Application No. 62/588,301, filed on Nov. 17, 2017, entitled "TECHNIQUES AND APPARATUSES FOR CHANNEL STATE INFORMATION AND HYBRID AUTOMATIC REPEAT REQUEST FEEDBACK RESOURCE ALLOCATION IN 5G," the contents of which are incorporated herein by reference in their entireties.

FIELD OF THE DISCLOSURE

Aspects of the present disclosure generally relate to wireless communication, and more particularly to techniques and apparatuses for channel state information (CSI) and hybrid automatic repeat request (HARD) feedback resource allocation in 5G.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment for wireless communication in a slot may include mapping channel state information (CSI) to first resource elements that are distributed in frequency, wherein the first resource elements are in a set of resources allocated on an uplink shared channel; mapping hybrid automatic repeat request (HARQ) feedback to second resource elements that are distributed in frequency, wherein the second resource elements are in the set of resources; wherein the second resource elements are reserved for the HARQ feedback and are different from the first resource elements; and transmitting the CSI and the HARQ feedback on the uplink shared channel in accordance with the mappings.

In some aspects, a user equipment for wireless communication may include memory and one or more processors coupled to the memory. The memory and the one or more processors may be configured to map channel state information (CSI) to first resource elements that are distributed in frequency, wherein the first resource elements are in a set of resources allocated on an uplink shared channel; map hybrid automatic repeat request (HARQ) feedback to second resource elements that are distributed in frequency, wherein the second resource elements are in the set of resources; wherein the second resource elements are reserved for the HARQ feedback and are different from the first resource elements; and transmit the CSI and the HARQ feedback on the uplink shared channel in accordance with the mappings.

In some aspects, a non-transitory computer-readable medium may store one or more instructions for wireless communication. The one or more instructions, when executed by one or more processors of a user equipment, may cause the one or more processors to map channel state information (CSI) to first resource elements that are distributed in frequency, wherein the first resource elements are in a set of resources allocated on an uplink shared channel; map hybrid automatic repeat request (HARQ) feedback to second resource elements that are distributed in frequency, wherein the second resource elements are in the set of resources; wherein the second resource elements are reserved for the HARQ feedback and are different from the first resource elements; and transmit the CSI and the HARQ feedback on the uplink shared channel in accordance with the mappings.

In some aspects, an apparatus for wireless communication may include means for mapping channel state information (CSI) to first resource elements that are distributed in frequency, wherein the first resource elements are in a set of resources allocated on an uplink shared channel; means for mapping hybrid automatic repeat request (HARQ) feedback to second resource elements that are distributed in frequency, wherein the second resource elements are in the set of resources, wherein the second resource elements are reserved for the HARQ feedback and are different from the first resource elements; and means for transmitting the CSI and the HARQ feedback on the uplink shared channel in accordance with the mappings.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a downlink (DL)-centric subframe, in accordance with various aspects of the present disclosure.

FIG. 6 is a diagram illustrating an example of an uplink (UL)-centric subframe, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
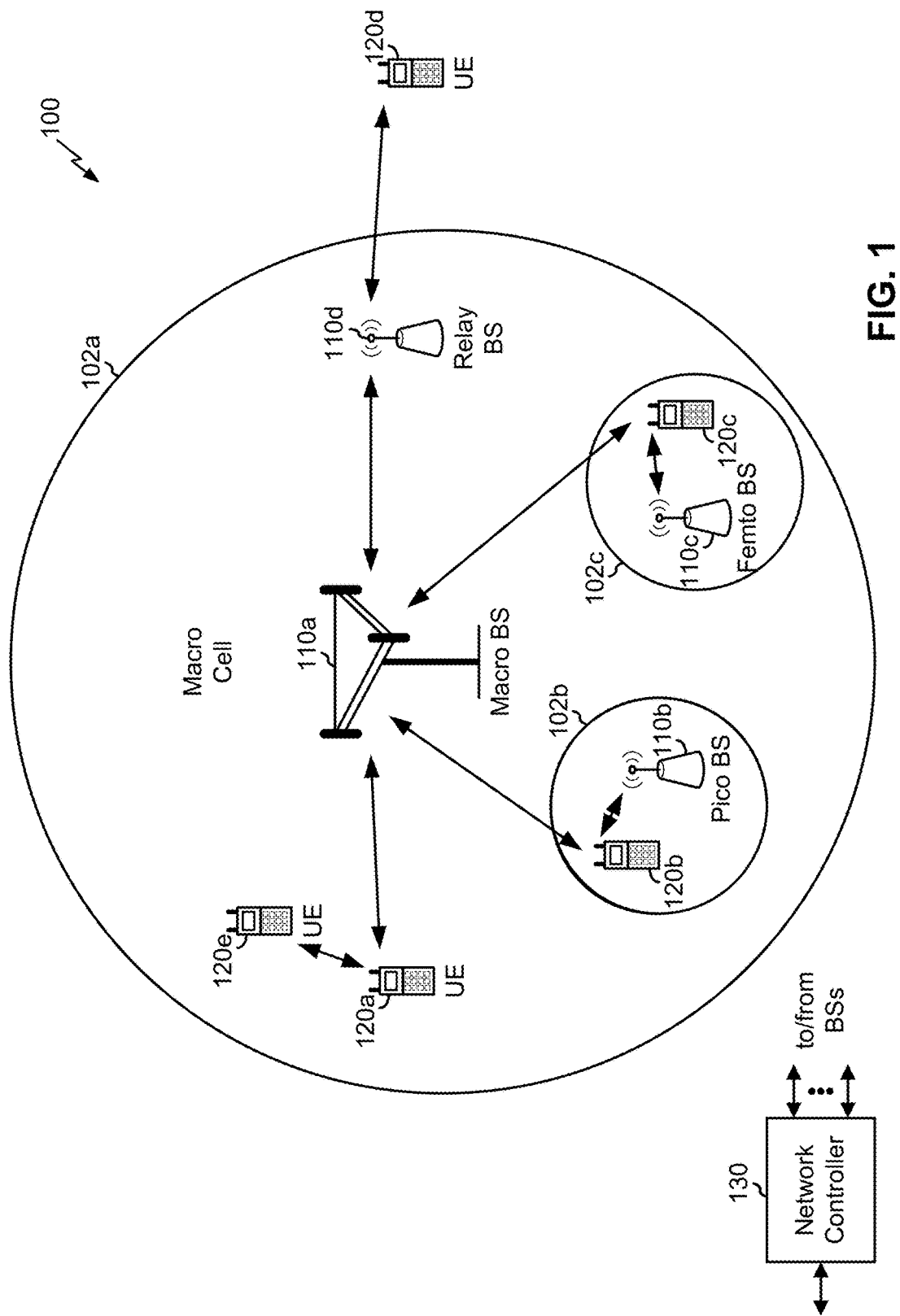
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
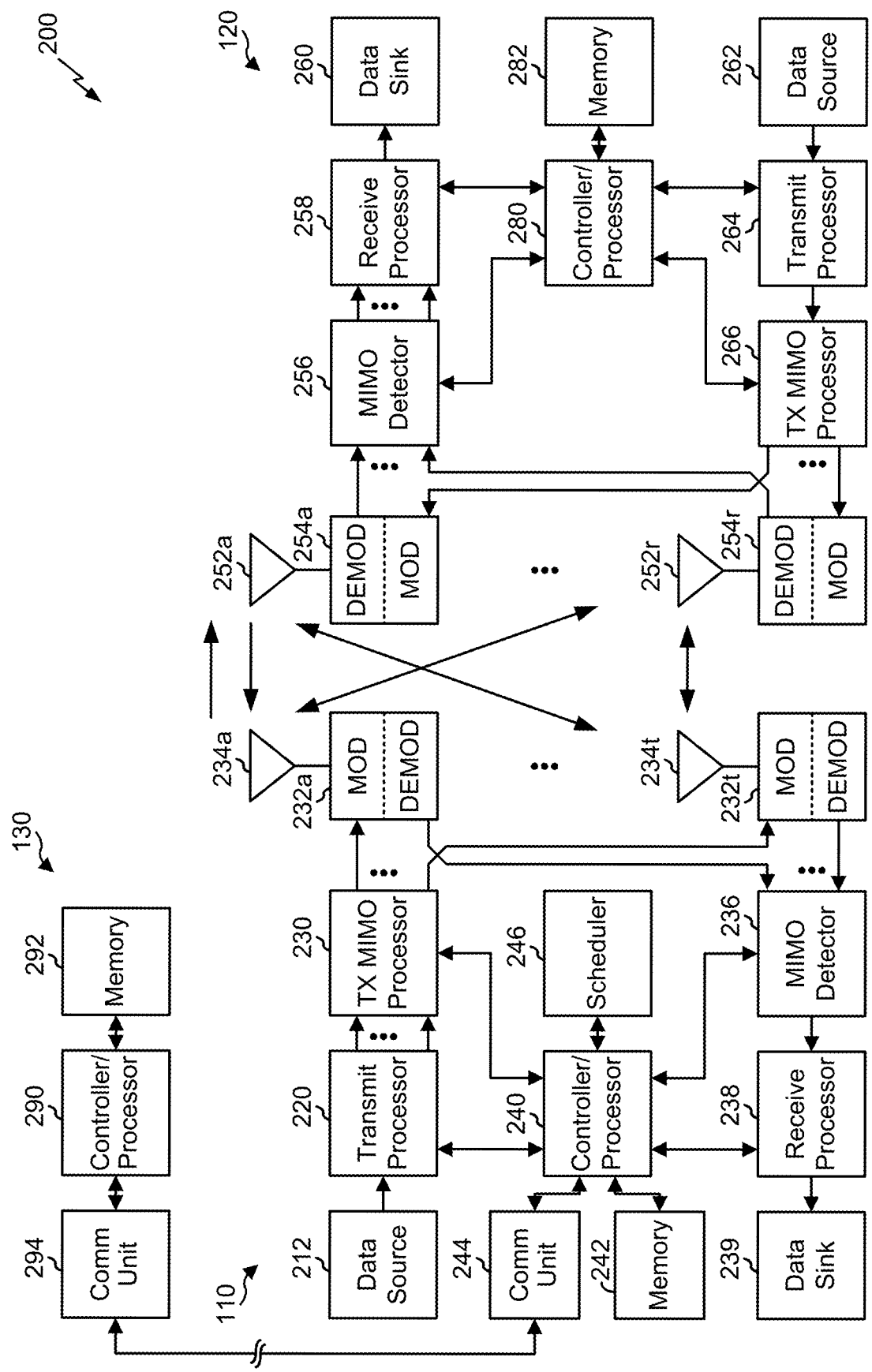
FIG. 2 is a block diagram conceptually illustrating an example 200 of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with CSI and HARQ feedback resource allocation in 5G, as described in more detail elsewhere herein. For example, controller/processor 240 of BS 110, controller/processor 280 of UE 120, and/or any other component(s) of FIG. 2 may perform or direct operations of, for example, process 900 of FIG. 9 and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for mapping channel state information (CSI) to first resource elements that are distributed in frequency, wherein the first resource elements are in a set of resources allocated on an uplink shared channel; means for mapping hybrid automatic repeat request (HARQ) feedback to second resource elements that are distributed in frequency, wherein the second resource elements are in the set of resources, wherein the second resource elements are reserved for the HARQ feedback and are different from the first resource elements; and means for transmitting the CSI and the HARQ feedback on the uplink shared channel in accordance with the mappings; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
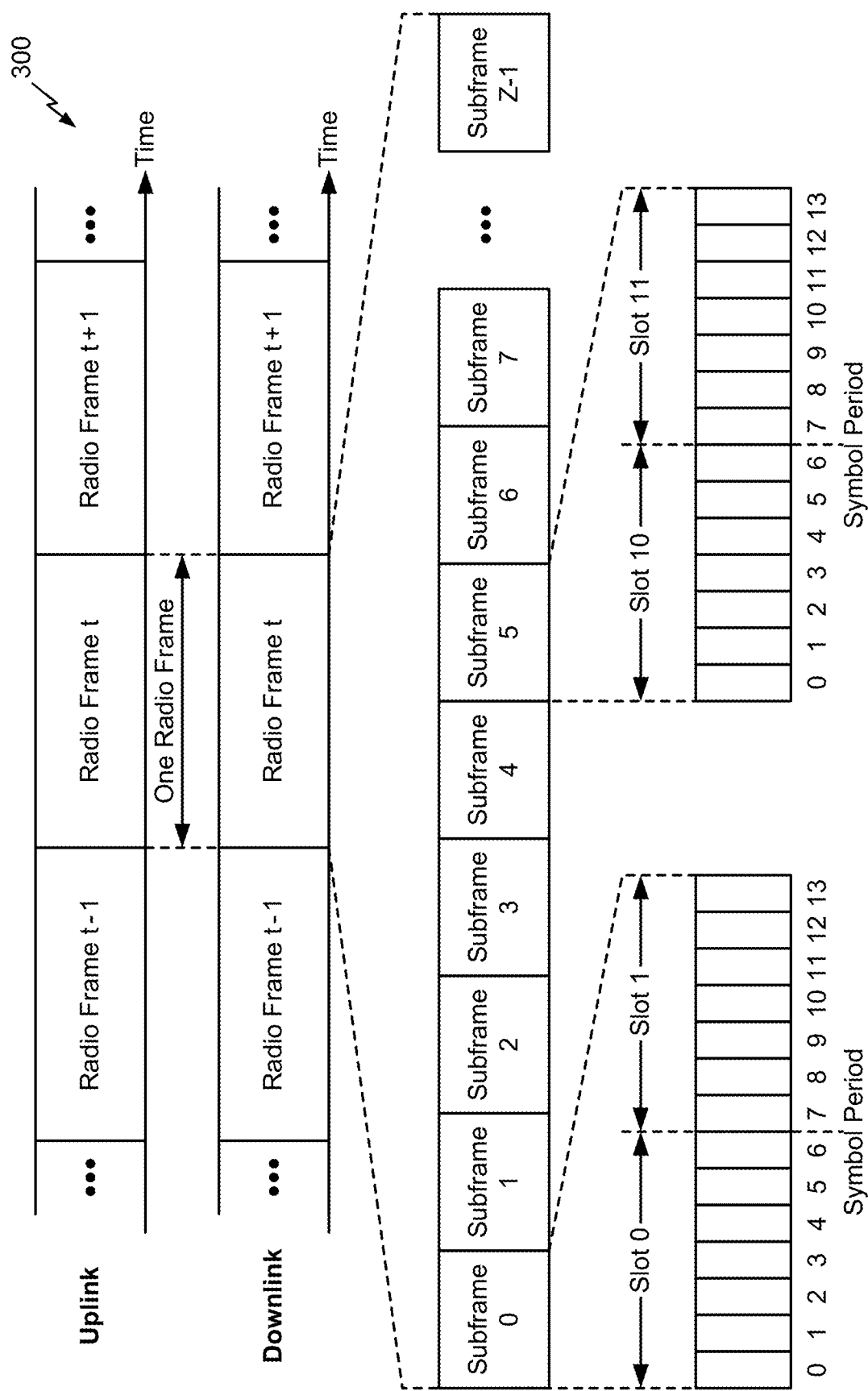
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
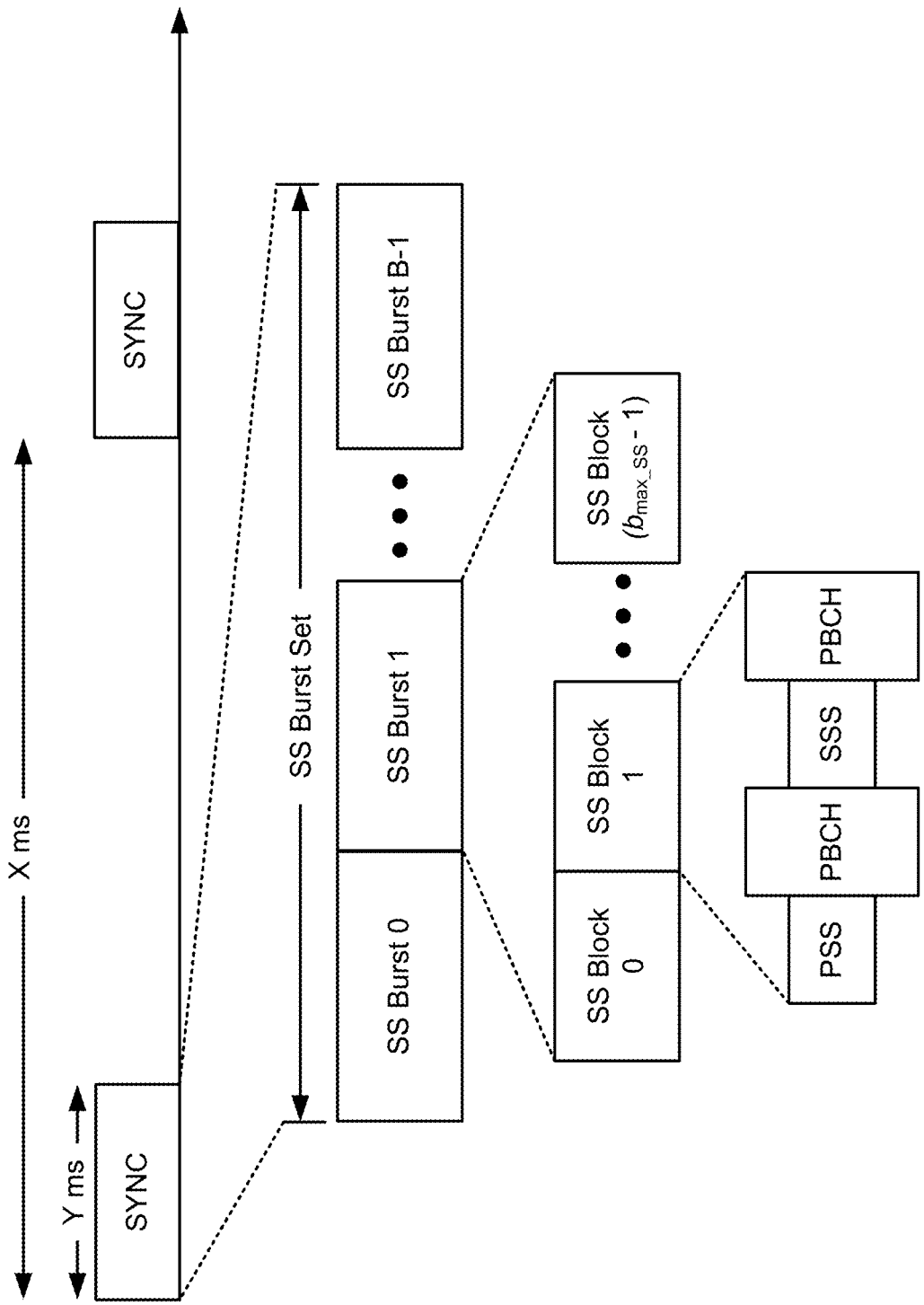
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B–1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
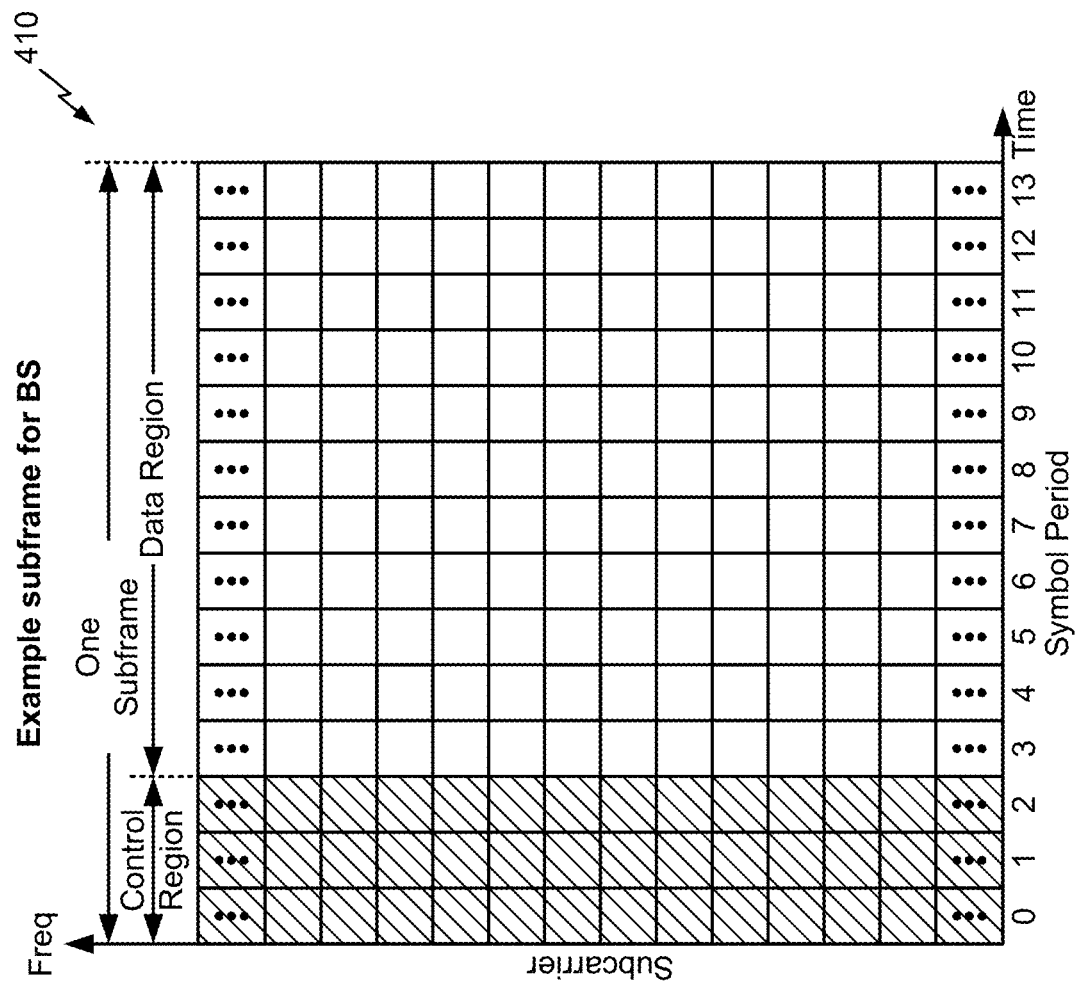
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q–1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) or above sub-6 GHz targeting high carrier frequency (e.g., 27 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

A UE may transmit uplink control information (UCI), such as CSI and/or HARQ feedback, and uplink data, such as an uplink shared channel (e.g., the physical uplink shared channel, or PUSCH). One approach for such a transmission is using the uplink shared channel to transmit the UCI. This may be referred to as piggybacking the UCI on the uplink shared channel. In some aspects, the UE may perform rate matching of the uplink shared channel to transmit the UCI on the uplink shared channel (e.g., when the UCI is HARQ feedback with more than 2 bits). In some aspects, the UE may puncture the uplink shared channel to transmit the UCI on the uplink shared channel (e.g., when the UCI is HARQ feedback with 1 or 2 bits).

Certain challenges may arise when piggybacking the UCI on the uplink shared channel. For example, if too many uplink shared channel resources are punctured in close proximity, a single code block (CB) may be heavily punctured, thereby decreasing throughput of the uplink shared channel. Furthermore, if UCI resources are in close proximity in the uplink shared channel, time diversity may be weak, which may lead to problems in certain scenarios, such as high-Doppler-effect scenarios. Still further, if the HARQ feedback punctures the CSI, uplink shared channel performance may be negatively impacted.

Some techniques and apparatuses described herein provide allocation of uplink shared channel resources for CSI and HARQ feedback. For example, resources allocated for the CSI may be different than resources allocated for the HARQ feedback, which eliminates puncturing of the CSI by the HARQ feedback or vice versa. Furthermore, resources for the HARQ feedback may be allocated in a diagonal pattern with wraparound, as described in more detail below, which improves time and frequency diversity and reduces the impact of the HARQ feedback resource allocation on data to be transmitted in the uplink shared channel. Still further, the CSI may be allocated using a frequency first mapping rule, as described in more detail below, which improves frequency diversity of the CSI. Thus, piggybacking of UCI on a PUSCH is improved, time and frequency diversity of the UCI is improved, and impact on the PUSCH is reduced.

Figure 7A:
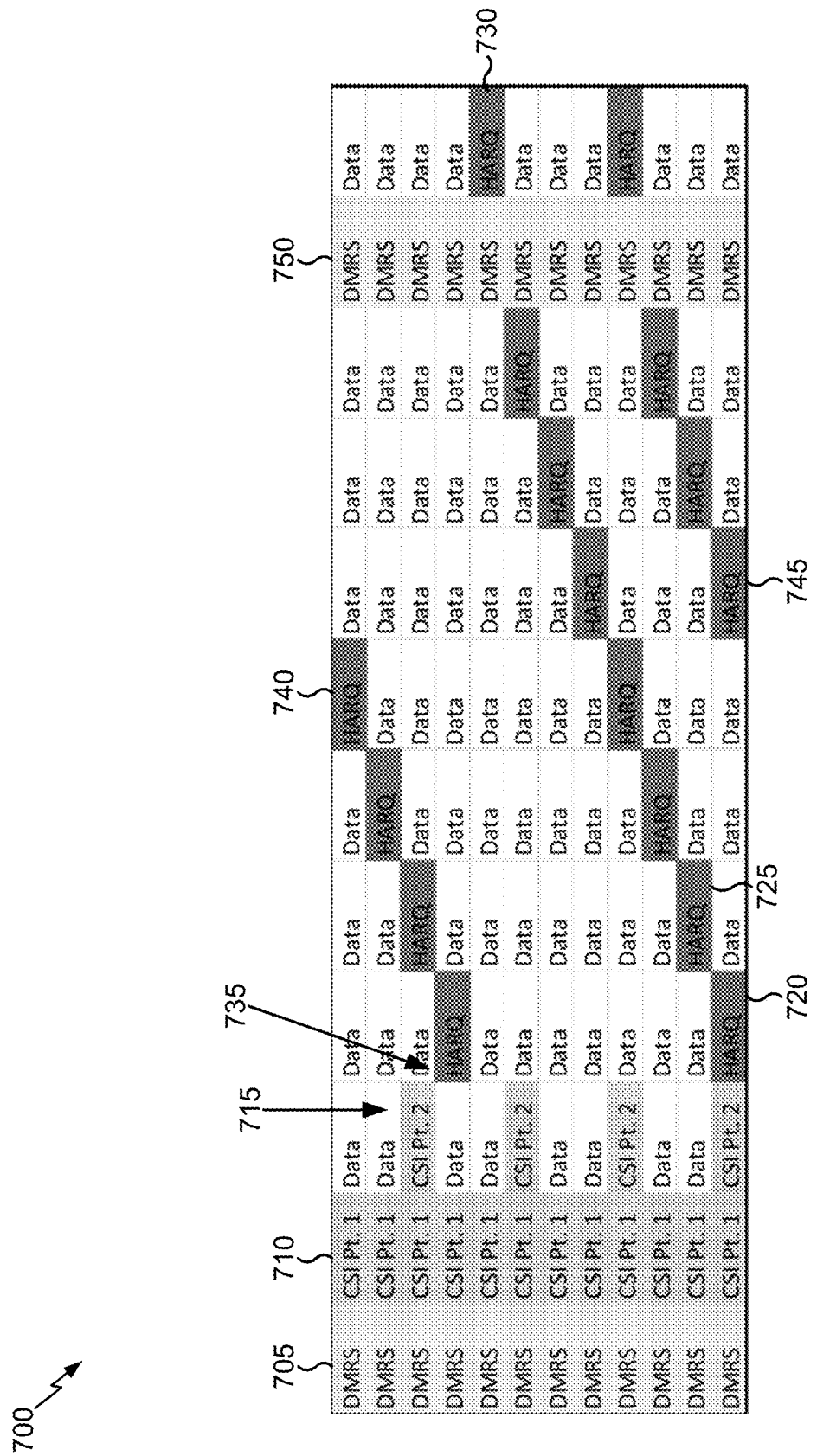
FIGS. 7A and 7B are diagrams illustrating examples of resource allocation for UCI piggybacking on a PUSCH in 5G, in accordance with various aspects of the present disclosure.
Figure 7B:
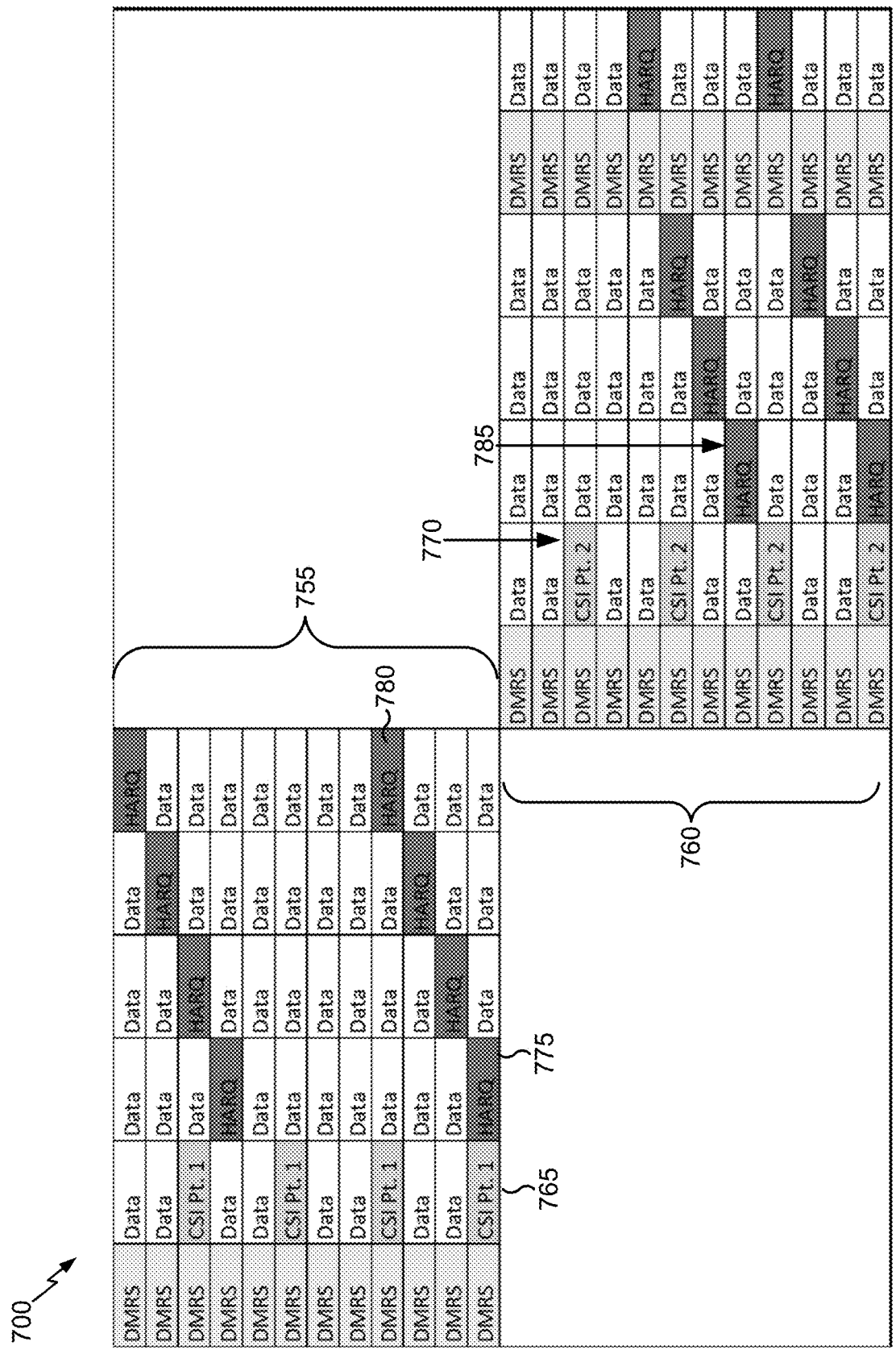

FIGS. 7A and 7B are diagrams illustrating examples 700 of resource allocation for UCI piggybacking on a PUSCH in 5G, in accordance with various aspects of the present disclosure. FIG. 7A shows an example wherein frequency hopping is not used, and FIG. 7B shows an example wherein frequency hopping is used. FIGS. 7A and 7B show resources of an uplink shared channel, which may be situated in an UL region of a slot such as UL long burst portion (e.g., UL long burst portion 604). In FIGS. 7A and 7B, each rectangle of the grid corresponds to a resource element. For example, each row of the grid may correspond to a frequency or subcarrier (e.g., a subcarrier for CP-OFDM or a virtual subcarrier for DFT-s-OFDM), and each column of the grid may correspond to a symbol. Therefore, moving rightward in the grid may increase time, and moving upward in the grid may increase frequency with regard to a corresponding resource.

As shown by reference number 705, the uplink shared channel may include a first reference signal, shown in FIG. 7A as a demodulation reference signal (DMRS). The first reference signal may be provided in a first symbol of the uplink shared channel to improve efficiency of demodulating the uplink shared channel. As further shown, the first reference signal may occupy an entire symbol of the uplink shared channel. In some aspects, the first reference signal may be another type of reference signal, such as a sounding reference signal or a phase-tracking reference signal.

As shown by reference number 710, a plurality of CSI signals may be mapped in a symbol following the first reference signal. For example, a first CSI of the plurality of CSI signals may be mapped in the symbol immediately following the first reference signal. This may enable earlier decoding of the first CSI of the plurality of CSI signals. As shown by reference number 715, when frequency hopping is not used, a second CSI of the plurality of CSI signals may be mapped to a symbol immediately following the first CSI of the plurality of CSI signals. For example, and as shown, the second CSI may be mapped to resource elements (REs) that are distributed in frequency.

In some aspects, the mapping of the plurality of CSI signals may be based at least in part on the following pseudo-code, wherein:

l is an index of OFDM within the PUSCH duration (including DMRS for PUSCH),
k is an index of a subcarrier within the PUSCH RB assignment for the CP-OFDM waveform, or an index of a virtual subcarrier within the PUSCH RB assignment for the DFT-S-OFDM waveform,
$M^l$ is a number of subcarriers, excluding phase-tracking reference signals at OFDM symbol l,
M is a number of subcarriers, including phase-tracking reference signals, within the PUSCH RB assignment,
$Q_{CSI}$ is the number of modulated symbols of the CSI, and
$q_{CSI}$ is a counter for the number of mapped CSI symbols.
1. Initialization: Set k = 0, l = 0, $q_{CSI}$ = 0
2. While $q_{CSI} < Q_{CSI}$
   2.1. If OFDM symbol l is a DMRS symbol
      2.1.1. l = l + 1
   2.2. Else
      2.2.1. If $Q_{CSI} < M^l$
         2.2.1.1. Set $d = \mathrm{floor}\left(\dfrac{M^l}{Q^l_{CSI}}\right)$

```
    2.2.2. Else
        2.2.2.1. set d = 1
    2.2.3. End
    2.2.4. While RE (k, l) is a PTRS RE
        2.2.4.1. k = k + 1
    2.2.5. End
    2.2.6. map CSI symbol q_CSI to RE (k, l)
    2.2.7. k = k + d; q_CSI = q_CSI + 1
    2.2.8. If k > M
        2.2.8.1. l = l + 1
    2.2.9. End
  2.3. End
3. End
```

In the above pseudo-code, at step 2.1, the UE 120 determines a location of the CSI so that the CSI does not overlap the DMRS. At steps 2.2.1 and 2.2.2, the UE 120 determines a step size (d) for the CSI signal allocation. Here, the step size is determined to be 1 when the number of symbols of the plurality of CSI signals is greater than or equal to the number of subcarriers that do not include a phase-tracking reference signal, and is determined to be the floor of $M^l/Q_{CSI}$ when the number of symbols of the CSI signal is less than the number of subcarriers that do not include a phase-tracking reference signal. At step 2.2.4, the UE 120 skips resource elements that include a phase-tracking reference signal so that phase-tracking reference signals are not punctured by the CSI signal. At steps 2.2.6 through 2.2.8, the UE 120 maps the CSI signals to increasing frequency resources. For example, the UE 120 may start at a lowest frequency resource or subcarrier of the physical shared channel, and may map each CSI of the CSI signals to an increasing frequency or subcarrier. The above pseudo-code is provided merely as an example, and other aspects are contemplated herein.

In some aspects, the UE 120 may map CSI to first resource elements that are distributed in frequency, as described above. For example, the first resource elements may be distributed in frequency according to the step size d. In some aspects, as described above, the step size can be greater than 1. In some aspects, the step size may be based at least in part on the amount of CSI to be mapped. For example, as indicated above, the step size is determined to be 1 when the number of symbols of the plurality of CSI signals is greater than or equal to the number of subcarriers that do not include a phase-tracking reference signal, and is determined to be the floor of $M^l/Q_{CSI}$ when the number of symbols of the CSI signal is less than the number of subcarriers that do not include a phase-tracking reference signal. An example of the step size is shown with regard to the CSI Part 2 in FIG. 7A (e.g., reference number 715). In FIG. 7A, the CSI Part 1 has a step size of 1 and the CSI Part 2 has a step size of 3. In some aspects, this may be based at least in part on a number of REs for which CSI Part 1 is to be mapped and a number of REs for which CSI Part 2 is to be mapped.

The above algorithm provides for frequency-first, time-second mapping. For example, the conditional at Step 2.2.8 and 2.2.8.1 causes all resource elements of a first symbol to be mapped before resource elements of a second symbol are mapped, since k is a subcarrier index, M is a total number of subcarriers, and/is an OFDM symbol index. Furthermore, the while loop at Step 2.2.4 and 2.2.4.1 cause phase-tracking reference signals to be excluded from the first resource elements.

In the above pseudo-code, and in the pseudo-code described below in connection with FIG. 7B, k is not necessarily a physical subcarrier index. A mapping from k to the physical subcarrier index in the uplink bandwidth part (BWP) may take into account the starting resource block (RB) index and frequency hopping offset, if frequency hopping is enabled. Also, in FIG. 7A, the second CSIs have a wider spacing in the frequency domain than the first CSIs. This may be because resource elements in between the second CSIs include phase-tracking reference signals, or because there are fewer of the second CSIs than the first CSIs.

As shown by reference number 720, a plurality of HARQ feedback signals may be mapped in a diagonal pattern with regard to symbols and subcarriers of the uplink shared channel. A HARQ feedback signal may include a HARQ ACK and/or a HARQ NACK. For example, consider a first HARQ feedback signal (shown by reference number 720) and a second HARQ feedback signal (shown by reference number 725). As can be seen, the second HARQ feedback signal is mapped to a next symbol in time and a next subcarrier in relation to the first HARQ feedback signal. By mapping the HARQ feedback signals in the diagonal pattern, frequency and time diversity of the HARQ feedback signals is improved. Mapping the HARQ feedback signals in the diagonal pattern is provided as an example. Techniques and apparatuses described herein are not limited to those in which a diagonal pattern is used to map the plurality of HARQ feedback signals.

In some aspects, the HARQ feedback signals may be mapped to resource elements that are different than (e.g., orthogonal to, non-overlapped with, etc.) resource elements used for the CSI signals. For example, the DMRS may be mapped to a first symbol of the uplink shared channel, the CSI signals may be mapped to second and third symbols of the uplink shared channel, and the HARQ feedback signals may be mapped to a remainder of the symbols of the uplink shared channel. As another example, the HARQ feedback may be mapped to resource elements that are reserved for the HARQ feedback, and the CSI may not be mapped to the resource elements that are reserved for the HARQ feedback. This may reduce or eliminate puncturing of the CSI signals by the HARQ feedback signals.

As further shown, in some aspects, the diagonal pattern may wrap around a slot boundary of the uplink shared channel. For example, when the diagonal pattern reaches one slot boundary of the uplink shared channel, shown by reference number 730, the diagonal pattern may wrap around to the opposite slot boundary of the uplink shared channel (without extending into the DMRS or CSI regions of the uplink shared channel), shown by reference number 735. This can occur in the horizontal direction (shown by reference numbers 730 and 735) or in the vertical direction (shown by reference numbers 740 and 745).

In some aspects, the diagonal pattern may skip a resource associated with a reference signal. For example, and as shown by reference number 750, in some aspects, a second DMRS symbol may be included in the uplink shared channel. In such a case, the diagonal pattern may skip the second DMRS symbol and resume in a next symbol.

FIG. 7B shows an example of CSI and HARQ feedback resource allocation with frequency hopping. A first frequency hop is shown by reference number 755, and a second frequency hop is shown by reference number 760. As shown, a DMRS symbol may be provided in the first frequency hop and the second frequency hop.

As shown by reference number 765, when frequency hopping is performed, a first CSI may provided in a first frequency hop. For example, the frequency first resource allocation technique may be used to allocate resources for the first CSI, as described in more detail above. As shown by reference number 770, when frequency hopping is performed, a second CSI may be provided in a second frequency hop. For example, the frequency first resource allocation technique may be used to allocate resources for the second CSI, as described in more detail above.

As shown by reference number 775, when using frequency hopping, the diagonal pattern may be used to allocate resources for the DMRS signals. In this case, the diagonal pattern may not wrap around with regard to separate frequency hops. In other words, the diagonal pattern may continue from a fourth frequency resource in the first frequency hop (shown by reference number 780) to a fifth frequency resource in the second frequency hop (shown by reference number 785).

In some aspects, the diagonal pattern (e.g., with or without frequency hopping) may be determined according to the below pseudo-code, wherein:

uplink shared channel and the number of symbols of the HARQ feedback), although using a step size of 1 is possible for techniques and apparatuses described herein. At 2.2, the UE 120 determines to skip resource elements that are already used for a reference signal (e.g., DMRS or PTRS), CSI, or another HARQ feedback signal. At 2.3, HARQ feedback signals are mapped to resource elements in a diagonal pattern. As mentioned above, other frequency and time resource mapping approaches may be used, and the techniques and apparatuses described herein are not limited to those involving a diagonal resource pattern.

As can be seen, the step size, in the frequency direction, of the HARQ feedback (e.g., $d_f$) may be based at least in part on an amount of the HARQ feedback. Here, the step size is based at least in part on the number of subcarriers in the uplink shared channel and the number of symbols of the HARQ feedback. Furthermore, the HARQ feedback may be mapped in a frequency-first fashion, shown by $k=mod(k+d_f, M)$.

As indicated above, FIGS. 7A and 7B are provided as an example. Other examples are possible and may differ from what was described with respect to FIGS. 7A and 7B.

Figure 8:
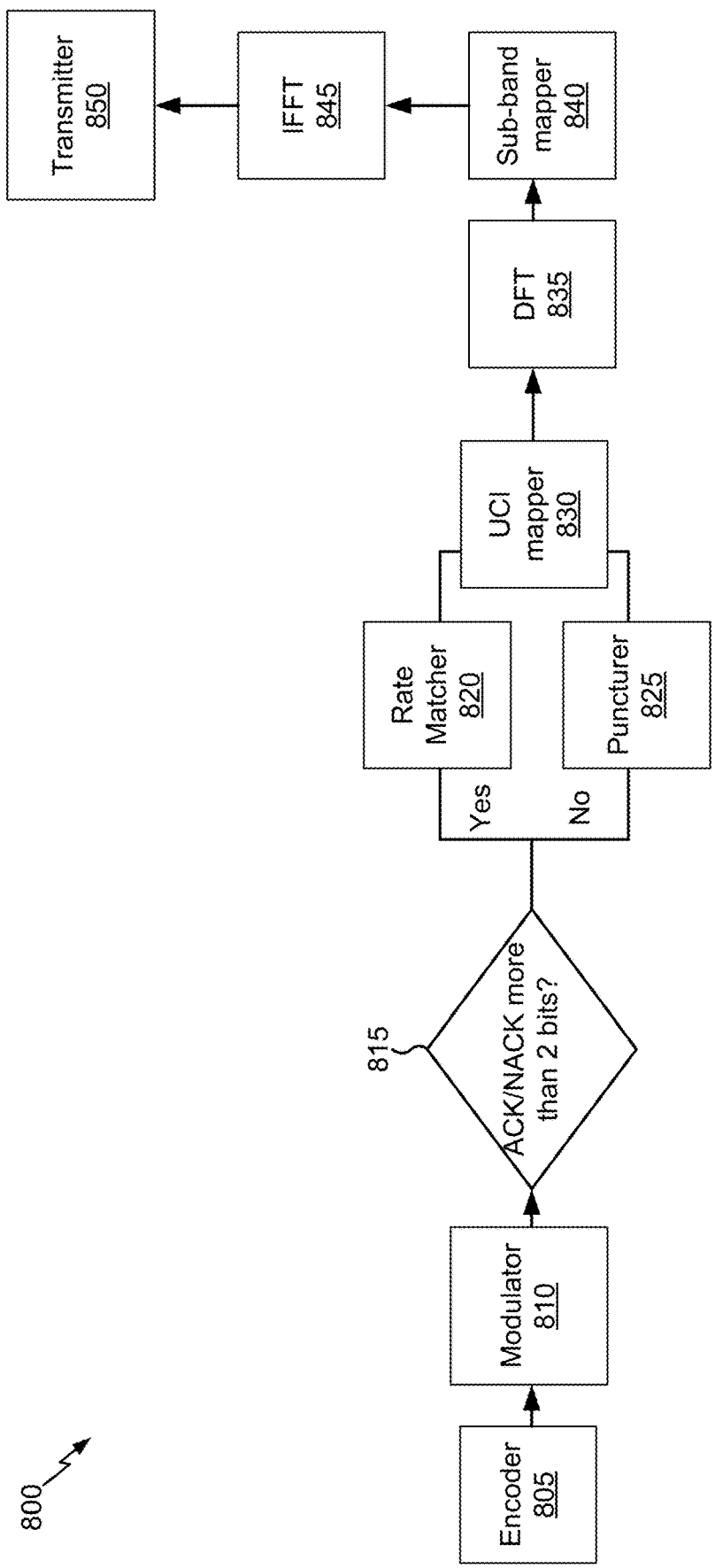
FIG. 8 is a diagram illustrating an example of a system for transmitting a PUSCH with UCI piggybacking in 5G, in accordance with various aspects of the present disclosure.

FIG. 8 is a diagram illustrating an example of a system 800 for transmitting a PUSCH with UCI piggybacking in 5G, in accordance with various aspects of the present disclosure. System 800 may include one or more of the components of UE 120 described in connection with FIG. 2, above.

As shown in FIG. 8, an encoder component 805 may encode a communication (not shown). The communication may include UCI (e.g., CSI signals and/or HARQ feedback signals) and/or an uplink shared channel on which the UCI is to be piggybacked. As further shown, a modulator component 810 may modulate the encoded communication (e.g., onto a carrier signal). As shown by reference number 815,

--- l is an index of an OFDM symbol within the PUSCH duration (including DMRS),
$L_{start}$ is the starting OFDM symbol for HARQ feedback RE mapping (assuming CSI is mapped through OFDM symbol $L_{start} - 1$),
$L_{end}$ is the ending OFDM symbol available for HARQ feedback RE mapping,
k is the index of a subcarrier within the PUSCH RB assignment for CP-OFDM waveform, or the index of a virtual subcarrier within the PUSCH RB assignment for the DFT-S-OFDM waveform,
M is the number of subcarriers including phase-tracking reference signals (PTRS) within the PUSCH RB assignment,
$d_f$ is a step size in the frequency (subcarrier) direction,
$d_t$ is a step size in the time (symbol) direction,
$Q_{ACK}$ is the number of modulated symbols of the HARQ feedback, and
$q_{ACK}$ is a counter for the number of mapped HARQ feedback modulated symbols.
1. Initialization: Set k = 0, l = 0, $q_{ACK}$ = 0
2. While $q_{ACK} < Q_{ACK}$ 2.1. $$\text{Set } d_f = \text{ceiling}\left(\frac{M}{Q_{ACK}}\right), d_t = \text{ceiling}\left(\frac{L_{end} - L + 1}{Q_{ACK}}\right)$$

2.2. While RE (k, l) is a PTRS RE, a DMRS RE, a CSI RE, or a HARQ feedback RE
      2.2.1. l = mod(l + 1, $L_{end} - L_{start}$ +1) + $L_{start}$
   2.3. End
   2.4. Map HARQ feedback signal $q_{ACK}$ to RE (k, l)
   2.5. k = mod(k + $d_f$, M); l = mod(l + $d_t$, $L_{end} - L_{start}$ + 1) + $L_{start}$;
   2.6. $q_{ACK} = q_{ACK} + 1$
3. End

---

At 2.1, step sizes in the frequency and time directions are determined. As can be seen, the techniques and apparatuses described herein are not limited to a step size of 1 (e.g., since $d_f$ is based at least in part on the number of subcarriers in the the system 800 may selectively perform rate matching (e.g., by a rate matching component 820 or a puncturing component 825) of the uplink shared channel based at least in part on whether the HARQ feedback includes more than two bits.

For example, the system 800 may rate match or puncture resources of the uplink shared channel for the UCI (e.g., HARQ feedback signals and/or CSI signals).

As further shown, a UCI mapper component 830 may map the UCI (e.g., the CSI signals and/or the HARQ feedback signals) to resource elements of the uplink shared channel, as described in more detail in connection with FIG. 8. In some aspects, such as when CP-OFDM is used, the UCI may be mapped to subcarriers such as physical subcarriers. In some aspects, such as when DFT-s-OFDM is used as in FIG. 8, the UCI may be allocated to virtual subcarriers before DFT spreading is applied and the output signal is generated. Virtual subcarriers are known and described, for example, in 3GPP Technical Specification 36.211 (e.g., Section 5.3.3). For example, a virtual subcarrier may be associated with an index value i, which may be the modulated symbol index for a length of M complex-valued symbols $d(0), \ldots, d(M_{symb}-1)$. These may be divided into $M_{symb}/M_{sc}^{PUSCH}$ sets, each corresponding to one SC-FDMA symbol. Transform precoding may be applied according to $$z(l \cdot M_{sc}^{PUSCH} + k) = \frac{1}{\sqrt{M_{sc}^{PUSCH}}} \sum_{i=0}^{M_{sc}^{PUSCH}-1} d(l \cdot M_{sc}^{PUSCH} + i) e^{-j\frac{2\pi i k}{M_{sc}^{PUSCH}}}$$

$$k = 0, \ldots, M_{sc}^{PUSCH} - 1$$

$$l = 0, \ldots, M_{symb}/M_{sc}^{PUSCH} - 1$$

resulting in a block of complex-valued symbols $z(0), \ldots, z(M_{symb}-1)$. The variable $M_{sc}^{PUSCH} = M_{RB}^{PUSCH} \cdot N_{sc}^{RB}$, where $M_{RB}^{PUSCH}$ represents the bandwidth of the PUSCH in terms of resource blocks, and shall fulfil $$M_{RB}^{PUSCH} = 2^{\alpha_2} \cdot 3^{\alpha_3} \cdot 5^{\alpha_5} \leq N_{RB}^{UL}$$

where $\alpha_2$, $\alpha_3$, $\alpha_5$ is a set of non-negative integers.

A DFT component 835 may perform discrete Fourier transform (DFT) spreading of the uplink shared channel. A sub-band mapping component 840 may map the output of the DFT spreading to sub-bands (e.g., physical subcarriers) of an output signal. An IFFT component 845 may perform an inverse fast Fourier transform (IFFT) to prepare the uplink shared channel or output signal for transmission. A transmitter component 850 may transmit the uplink shared channel or output signal.

As indicated above, FIG. 8 is provided as an example. Other examples are possible and may differ from what was described with respect to FIG. 8.

Figure 9:
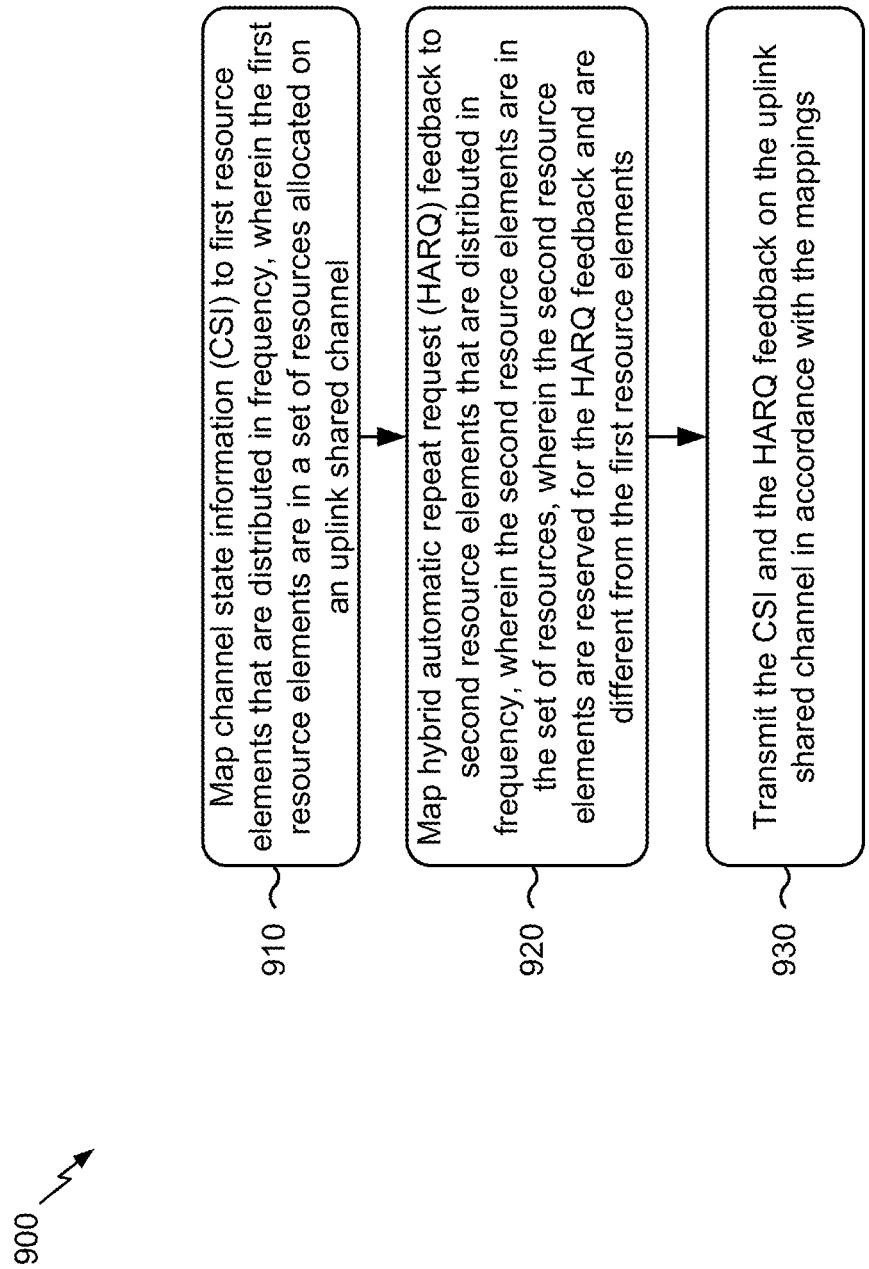
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs resource allocation for UCI piggybacking on a PUSCH in 5G.

As shown in FIG. 9, in some aspects, process 900 may include mapping channel state information (CSI) to first resource elements that are distributed in frequency, wherein the first resource elements are in a set of resources allocated on an uplink shared channel (block 910). For example, the UE (e.g., using controller/processor 280, transmit processor 264, TX MIMO processor 266, MOD 254, antenna 252, and/or the like) may map CSI to first resource elements that are distributed in frequency. The first resource elements may be in a set of resources of an uplink shared channel (e.g., in a slot). In some aspects, the first resource elements may be located after a reference signal (e.g., DMRS) of the uplink shared channel. For example, the first resource elements may be located immediately after the reference signal. In some aspects, the first resource elements may be located elsewhere in a slot.

As shown in FIG. 9, in some aspects, process 900 may include mapping hybrid automatic repeat request (HARQ) feedback to second resource elements that are distributed in frequency, wherein the second resource elements are in the set of resources, wherein the second resource elements are reserved for the HARQ feedback and are different from the first resource elements (block 920). For example, the UE (e.g., using controller/processor 280, transmit processor 264, TX MIMO processor 266, MOD 254, antenna 252, and/or the like) may map HARQ feedback to second resource elements of the uplink shared channel. The second resource elements may be different than the first resource elements. For example, the second resource elements may be orthogonal to the first resource elements. In some aspects, the second resource elements may be reserved for the HARQ feedback. This may prevent puncturing of the CSI by the HARQ feedback. In some aspects, the HARQ feedback are mapped in a diagonal pattern with regard to symbols and frequencies of the uplink shared channel, which improves time and frequency diversity of the HARQ feedback and reduces an impact of puncturing with regard to the uplink shared channel. In some aspects, the UE may map the HARQ feedback to the second resource elements before mapping the CSI to the first resource elements. In some aspects, the UE may determine which resources are reserved for the HARQ feedback before mapping the CSI.

As shown in FIG. 9, in some aspects, process 900 may include transmitting the CSI and the HARQ feedback on the uplink shared channel in accordance with the mappings (block 930). For example, the UE (e.g., using controller/processor 280, transmit processor 264, TX MIMO processor 266, MOD 254, antenna 252, and/or the like) may transmit the uplink shared channel including the plurality of CSI signals and the plurality of HARQ feedback signals. In this way, UCI is piggybacked on the uplink shared channel while maintaining frequency and time diversity of the UCI. Furthermore, an impact of the piggybacking on the uplink shared channel is reduced.

Process 900 may include additional aspects, such as any single aspect and/or any combination of aspects described below and/or in connection with one or more other processes described elsewhere herein.

In some aspects, a first slot boundary of the uplink shared channel is reached, the diagonal pattern wraps around to a second slot boundary of the uplink shared channel that is opposite from the first slot boundary. In some aspects, the first resource elements are located after a reference signal of the uplink shared channel. In some aspects, the first resource elements are distributed in frequency.

In some aspects, when the uplink shared channel is not configured for frequency hopping, the plurality of CSI signals include first CSI and second CSI, and wherein the first CSI is mapped to resource elements that are adjacent to resource elements to which the second CSI is mapped. In some aspects, the plurality of CSI signals include first CSI and second CSI, and when the uplink shared channel is configured for frequency hopping, the first CSI is mapped to a first frequency hop and the second CSI is mapped to a second frequency hop.

In some aspects, the plurality of CSI signals and the plurality of HARQ feedback signals puncture data symbols of the uplink shared channel. In some aspects, rate matching is used for the plurality of CSI signals and the plurality of HARQ feedback signals. In some aspects, the diagonal pattern skips a resource element associated with a reference signal.

In some aspects, the second resource elements are mapped after a reference signal of the uplink shared channel. In some aspects, the first resource elements are distributed in frequency. In some aspects, the plurality of HARQ feedback signals puncture data symbols of the uplink shared channel. In some aspects, rate matching is used for the plurality of CSI signals and the plurality of HARQ feedback signals. In some aspects, one or more resource elements comprising a phase-tracking reference signal are excluded from the first resource elements. In some aspects, the first resource elements and the second resource elements are distributed in frequency based at least in part on respective step sizes, wherein the respective step sizes are based at least in part on respective amounts of the CSI and the HARQ feedback. In some aspects, wherein mapping the CSI and mapping the HARQ feedback are performed in a frequency-first, time-second manner. In some aspects, the first resource elements and the second resource elements are orthogonal such that the HARQ feedback does not puncture the CSI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE) for uplink transmission in a slot, comprising:
    mapping channel state information (CSI) to first resource elements that are distributed in frequency,
        wherein the first resource elements are in a set of resources allocated on an uplink shared channel, and
        wherein the first resource elements occupy at least a first orthogonal frequency division multiplexing (OFDM) symbol of the uplink shared channel;
    mapping hybrid automatic repeat request (HARQ) feedback to second resource elements that are distributed in frequency,
        wherein the second resource elements are in the set of resources,
        wherein the second resource elements are reserved for the HARQ feedback and are different from the first resource elements,
        wherein the first resource elements and the second resource elements are distributed in frequency based at least in part on respective step sizes for the CSI and the HARQ feedback,
        wherein a step size associated with the first resource elements is based at least in part on a quantity of modulated symbols of the CSI and a quantity of available subcarriers at the first OFDM symbol, and
        wherein a demodulation reference signal (DMRS) is provided in a second OFDM symbol of the uplink shared channel, and the first resource elements and the second resource elements occupy one or more OFDM symbols of the uplink shared channel that do not include the second OFDM symbol; and
    transmitting the CSI and the HARQ feedback on the uplink shared channel in accordance with the mappings.

2. The method of claim 1, wherein the step size associated with the first resource elements is one when an amount of CSI to be mapped, comprising the quantity of modulated symbols of the CSI, is greater than or equal to the quantity of available subcarriers of the first OFDM symbol.

3. The method of claim 1, wherein the CSI and the HARQ feedback are transmitted using OFDM with a cyclic prefix (CP) (CP-OFDM) or discrete Fourier transform spread OFDM (DFT-s-OFDM).

4. The method of claim 1, wherein the mapping of the CSI is performed in a frequency-first, time-second manner.

5. The method of claim 1, wherein the mapping of the HARQ feedback is performed in a frequency-first, time-second manner.

6. The method of claim 1, wherein the one or more OFDM symbols, occupied by the second resource elements, are located after the second OFDM symbol in the slot.

7. The method of claim 1, wherein a step size associated with the second resource elements is based at least in part on a quantity associated with the HARQ feedback and a quantity of subcarriers in the uplink shared channel.

8. The method of claim 1, further comprising:
mapping another CSI to third resource elements occupying a third OFDM symbol of the uplink shared channel.

9. A user equipment (UE) for wireless communication, comprising:
a memory; and
one or more processors, coupled to the memory, configured to:
map channel state information (CSI) to first resource elements that are distributed in frequency,
wherein the first resource elements are in a set of resources allocated on an uplink shared channel, and
wherein the first resource elements occupy at least a first orthogonal frequency division multiplexing (OFDM) symbol of the uplink shared channel;
map hybrid automatic repeat request (HARQ) feedback to second resource elements that are distributed in frequency,
wherein the second resource elements are in the set of resources,
wherein the second resource elements are reserved for the HARQ feedback and are different from the first resource elements,
wherein the first resource elements and the second resource elements are distributed in frequency based at least in part on respective step sizes for the CSI and the HARQ feedback,
wherein a step size associated with the first resource elements is based at least in part on a quantity of modulated symbols of the CSI and a quantity of available subcarriers at the first OFDM symbol, and
wherein a demodulation reference signal (DMRS) is provided in a second OFDM symbol of the uplink shared channel, and the first resource elements and the second resource elements occupy one or more OFDM symbols of the uplink shared channel that do not include the second OFDM symbol; and
transmit the CSI and the HARQ feedback on the uplink shared channel in accordance with the mappings.

10. The UE of claim 9, wherein the step size associated with the first resource elements is one when an amount of CSI to be mapped, comprising the quantity of modulated symbols of the CSI, is greater than or equal to the quantity of available subcarriers of the first OFDM symbol.

11. The UE of claim 9, wherein the CSI and the HARQ feedback are transmitted using OFDM with a cyclic prefix (CP) (CP-OFDM) or discrete Fourier transform spread OFDM (DFT-s-OFDM).

12. The UE of claim 9, wherein the CSI is mapped in a frequency-first, time-second manner.

13. The UE of claim 9, wherein the HARQ feedback is mapped in a frequency-first, time-second manner.

14. The UE of claim 9, wherein the one or more OFDM symbols, occupied by the second resource elements, are located after the second OFDM symbol in a slot.

15. The UE of claim 9, wherein a step size associated with the second resource elements is based at least in part on a quantity associated with the HARQ feedback and a quantity of subcarriers in the uplink shared channel.

16. The UE of claim 9, wherein the one or more processors are further configured to:
map another CSI to third resource elements occupying a third OFDM symbol of the uplink shared channel.

17. A non-transitory computer-readable medium storing a set of instructions for wireless communication, the set of instructions comprising:
one or more instructions that, when executed by one or more processors of a user equipment (UE), cause the UE to:
map channel state information (CSI) to first resource elements that are distributed in frequency,
wherein the first resource elements are in a set of resources allocated on an uplink shared channel, and
wherein the first resource elements occupy at least a first orthogonal frequency division multiplexing (OFDM) symbol of the uplink shared channel;
map hybrid automatic repeat request (HARQ) feedback to second resource elements that are distributed in frequency,
wherein the second resource elements are in the set of resources,
wherein the second resource elements are reserved for the HARQ feedback and are different from the first resource elements,
wherein the first resource elements and the second resource elements are distributed in frequency based at least in part on respective step sizes for the CSI and the HARQ feedback,
wherein a respective step size associated with the first resource elements is based at least in part on a quantity of modulated symbols of the CSI and a quantity of available subcarriers at the first OFDM symbol, and
wherein a demodulation reference signal (DMRS) is provided in a second OFDM symbol of the uplink shared channel, and the first resource elements and the second resource elements occupy one or more OFDM symbols of the uplink shared channel that do not include the second OFDM symbol; and
transmit the CSI and the HARQ feedback on the uplink shared channel in accordance with the mappings.

18. The non-transitory computer-readable medium of claim 17, wherein the respective step size associated with the first resource elements is one when an amount of CSI to be mapped, comprising the quantity of modulated symbols of the CSI, is greater than or equal to the quantity of available subcarriers of the first OFDM symbol.

19. The non-transitory computer-readable medium of claim 17, wherein the CSI and the HARQ feedback are transmitted using OFDM with a cyclic prefix (CP) (CP-OFDM) or discrete Fourier transform spread OFDM (DFT-s-OFDM).

20. The non-transitory computer-readable medium of claim 17, wherein the CSI is mapped in a frequency-first, time-second manner.

21. The non-transitory computer-readable medium of claim 17, wherein the HARQ feedback is mapped in a frequency-first, time-second manner.

22. The non-transitory computer-readable medium of claim 17, wherein the one or more OFDM symbols, occupied by the second resource elements, are located after the second OFDM symbol in a slot.

23. The non-transitory computer-readable medium of claim 17, wherein a step size associated with the second resource elements is based at least in part on a quantity associated with the HARQ feedback and a quantity of subcarriers in the uplink shared channel.

24. The non-transitory computer-readable medium of claim 17, wherein the one or more instructions further cause the UE to:
    map another CSI to third resource elements occupying a third OFDM symbol of the uplink shared channel.

25. An apparatus for wireless communication, comprising:
    means for mapping channel state information (CSI) to first resource elements that are distributed in frequency,
        wherein the first resource elements are in a set of resources allocated on an uplink shared channel, and
        wherein the first resource elements occupy at least a first orthogonal frequency division multiplexing (OFDM) symbol of the uplink shared channel;
    means for mapping hybrid automatic repeat request (HARQ) feedback to second resource elements that are distributed in frequency,
        wherein the second resource elements are in the set of resources,
        wherein the second resource elements are reserved for the HARQ feedback and are different from the first resource elements,
        wherein the first resource elements and the second resource elements are distributed in frequency based at least in part on respective step sizes for the CSI and the HARQ feedback,
        wherein a respective step size associated with the first resource elements is based at least in part on a quantity of modulated symbols of the CSI and a quantity of available subcarriers at the first OFDM symbol, and
        wherein a demodulation reference signal (DMRS) is provided in a second OFDM symbol of the uplink shared channel, and the first resource elements and the second resource elements occupy one or more OFDM symbols of the uplink shared channel that do not include the second OFDM symbol; and
    means for transmitting the CSI and the HARQ feedback on the uplink shared channel in accordance with the mappings.

26. The apparatus of claim 25, wherein the respective step size associated with the first resource elements is one when an amount of CSI to be mapped, comprising the quantity of modulated symbols of the CSI, is greater than or equal to the quantity of available subcarriers of the first OFDM symbol.

27. The apparatus of claim 25, wherein the CSI and the HARQ feedback are transmitted using OFDM with a cyclic prefix (CP) (CP-OFDM) or discrete Fourier transform spread OFDM (DFT-s-OFDM).

28. The apparatus of claim 25, wherein the means for mapping the CSI is performed in a frequency-first, time-second manner.

29. The apparatus of claim 25, wherein the means for mapping the HARQ feedback is performed in a frequency-first, time-second manner.

30. The apparatus of claim 25, wherein the one or more OFDM symbols, occupied by the second resource elements, are located after the second OFDM symbol in a slot.

31. The method of claim 1, wherein the HARQ feedback is mapped to the second resource elements before mapping the CSI to the first resource elements.

32. The method of claim 31, wherein the CSI is not mapped to the second resource elements.

33. The UE of claim 9, wherein the one or more processors, to map the HARQ feedback to the second resource elements, are configured to:
    map the HARQ feedback to the second resource elements before mapping the CSI to the first resource elements.

34. The UE of claim 33, wherein the one or more processors, to map the CSI to the first resource elements, are configured to:
    map the CSI to the first resource elements and not to the second resource elements.

\* \* \* \* \*